United States Patent
Ito

(10) Patent No.: US 10,310,783 B2
(45) Date of Patent: Jun. 4, 2019

(54) INFORMATION PROCESSING APPARATUS THAT PERFORMS NEAR-FIELD WIRELESS COMMUNICATION, CONTROL METHOD THEREFOR, AND STORAGE MEDIUM

(71) Applicant: CANON KABUSHIKI KAISHA, Tokyo (JP)

(72) Inventor: Koichi Ito, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 15/854,213

(22) Filed: Dec. 26, 2017

(65) Prior Publication Data
US 2018/0181353 A1 Jun. 28, 2018

(30) Foreign Application Priority Data
Dec. 27, 2016 (JP) .................... 2016-253180

(51) Int. Cl.
*G06F 3/12* (2006.01)
*H02J 50/10* (2016.01)
*H04W 4/80* (2018.01)
*H04B 5/00* (2006.01)

(52) U.S. Cl.
CPC .......... *G06F 3/1236* (2013.01); *G06F 3/1204* (2013.01); *G06F 3/1292* (2013.01); *H02J 50/10* (2016.02); *H04B 5/0056* (2013.01); *H04W 4/80* (2018.02)

(58) Field of Classification Search
CPC .................................................. G06F 3/1236
USPC ...................................................... 358/1.15
See application file for complete search history.

(56) References Cited

U.S. PATENT DOCUMENTS

| 6,126,077 | A | 10/2000 | Tanaka et al. | |
| 2009/0052348 | A1* | 2/2009 | Kato | H04L 63/0492 370/254 |
| 2009/0103124 | A1* | 4/2009 | Kimura | G06F 3/1204 358/1.15 |
| 2013/0005243 | A1* | 1/2013 | Royston | H04B 5/0043 455/41.1 |
| 2013/0196594 | A1* | 8/2013 | Moosavi | H04B 5/00 455/41.1 |
| 2013/0260684 | A1* | 10/2013 | Suzuki | H04B 5/00 455/41.1 |

(Continued)

FOREIGN PATENT DOCUMENTS

| JP | H1013312 A | 1/1998 |
| JP | 2005168069 A | 6/2005 |

*Primary Examiner* — Jacky X Zheng
(74) *Attorney, Agent, or Firm* — Rossi, Kimms & McDowell LLP

(57) ABSTRACT

An information processing apparatus which is able to reliably send desired communication setting data irrespective of specifications of an NFC R/W unit placed close to an NFC tag. The NFC tag sends data to a mobile terminal, which is put close the NFC tag, via near-field wireless communication. It is determined whether or not the NFC R/W unit has a transmitting function of transmitting other data to the mobile terminal, which is put close thereto, via the near-field wireless communication. In a case where the NFC R/W unit has the transmitting function and it is determined that the mobile terminal is put close to the information processing apparatus, the transmitting function of the NFC R/W unit is prohibited from being used.

17 Claims, 7 Drawing Sheets

(56) References Cited

U.S. PATENT DOCUMENTS

2013/0309964 A1* 11/2013 Hall ........................ H04B 5/00
 455/41.1
2014/0320898 A1* 10/2014 Koda ...................... G06F 3/125
 358/1.15
2017/0156022 A1* 6/2017 Keller .................. H04B 5/0031

* cited by examiner

INFORMATION PROCESSING APPARATUS THAT PERFORMS NEAR-FIELD WIRELESS COMMUNICATION, CONTROL METHOD THEREFOR, AND STORAGE MEDIUM

BACKGROUND OF THE INVENTION

Field of the Invention

The present invention relates to an information processing apparatus, a control method therefor, and a storage medium, and in particular to an information processing apparatus which performs near-field wireless communication, a control method therefor, and a storage medium.

Description of the Related Art

There is an MFP which is known as an information processing apparatus performing near-field wireless communication, for example, near-field wireless communication (hereafter referred to as "NFC communication") conforming to NFC (Near Field Communication) standards. The MFP has an NFC tag and an NFC R/W unit for performing NFC communication. The NFC tag stores, for example, communication setting data for performing wireless LAN communication with the MFP and sends the stored communication setting data to a mobile terminal or the like, which is put close to the NFC tag, via NFC communication. The NFC R/W unit receives user information or the like, which is for performing authentication at log-in to the MFP, from an ID card such as an employee ID card, which is put close to the NFC R/W unit, via NFC communication (see, for example, Japanese Laid-Open Patent Publication (Kokai) No. H10-13312 and Japanese Laid-Open Patent Publication (Kokai) No. 2005-168069). In recent years, there has also been developed an NFC R/W unit that has for example an NFC tag mode in which the NFC R/W stores data and sends the stored data via NFC communication as with the NFC tag, in addition to a function to receive the user information or the like via NFC communication.

In the MFP, as described above, processes which are performed by modules of the NFC tag and the NFC R/W unit are different from each other. When the modules that perform different processes are located away from each other, a user needs to hold a device over positions of the respective modules according to desired processes, which is inconvenient for the user. To address this problem, it is being contemplated that the NFC tag and the NFC R/W unit are collectively placed at a specific place in the MFP, and the NFC tag and the NFC R/W unit are arranged close to each other.

However, in a case where the NFC tag and the NFC R/W unit are arranged close to each other, the MFP may not be able to send desired communication setting data, depending on specifications of the NFC R/W unit. For example, in a case where the NFC R/W unit is placed in the NFC tag mode and stores other setting data different from communication setting data, the MFP may send other data different from desired communication setting data from the NFC R/W unit. As a result, the mobile terminal cannot obtain the desired communication setting data from the MFP and thus cannot configure communication settings for wireless LAN communication with the MFP.

SUMMARY OF THE INVENTION

The present invention provides an information processing apparatus which is able to reliably send desired communication setting data irrespective of specifications of an NFC R/W unit placed close to an NFC tag, a control method therefor, and a storage medium.

Accordingly, the present invention provides an information processing apparatus that has a first near-field wireless communication device that sends data to a mobile terminal, which is put close to the information processing apparatus, via near-field wireless communication, and a second near-field wireless communication device different from the first near-field wireless communication device, comprising a control unit configured to control the second near-field wireless communication device, a transmitting function determination unit configured to determine whether or not the second near-field wireless communication device has a transmitting function of transmitting other data to the mobile terminal, which is put close to the information processing apparatus, via the near-field wireless communication, and a close state determination unit configured to determine whether or not the mobile terminal is put close to the information processing apparatus, wherein, in a case where the second near-field wireless communication device has the transmitting function and the mobile terminal is put close to the information processing apparatus, the control unit prohibits the transmitting function of the second near-field wireless communication device from used.

According to the present invention, it is possible to reliably send desired communication setting data irrespective of specifications of the NFC R/W unit placed close to the NFC tag.

Further features of the present invention will become apparent from the following description of exemplary embodiments (with reference to the attached drawings).

DESCRIPTION OF THE EMBODIMENTS

The present invention will now be described in detail below with reference to the accompanying drawings showing an embodiments thereof.

In the following description of the present embodiment, the present invention is applied to an MFP which is an information processing apparatus, but the present invention may also be applied to apparatuses capable of performing near-field wireless communication such as NFC communication without being limited to the MFP.

Figure 1:
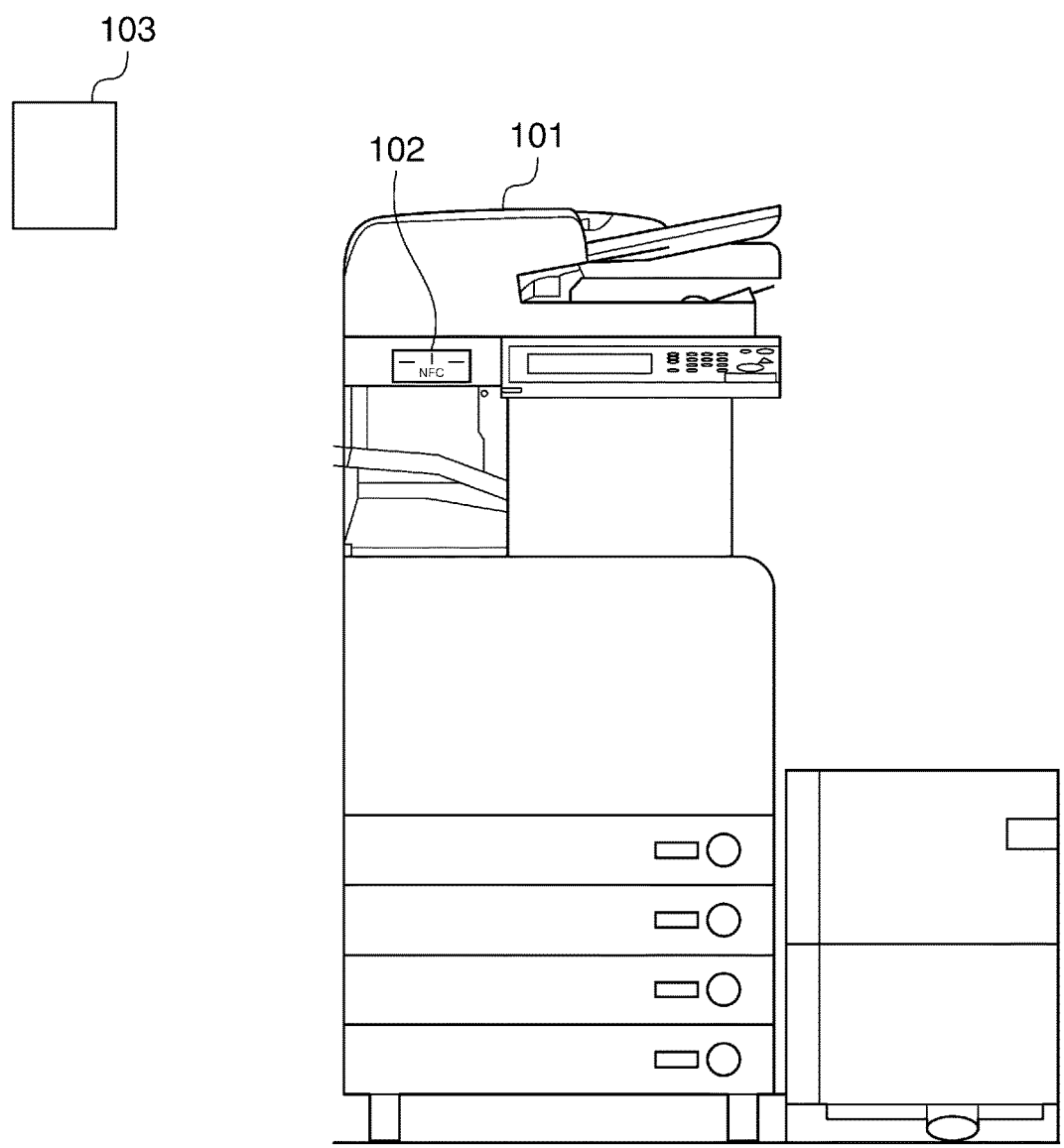
FIG. 1 is a front view showing an MFP which is an information processing apparatus according to an embodiment of the present invention.

FIG. 1 is a front view showing the MFP 101 which is an information processing apparatus according to the embodiment of the present invention.

The MFP 101 executes jobs such as copying, scanning, and facsimile communication. The MFP 101 also performs near-field wireless communication such as NFC communication, and wireless LAN communication of which a communication speed is higher than that of near-field wireless communication. A mark 102 is provided on an exterior of the MFP 101. When a user holds a device, which is capable of performing NFC communication, over the mark 102, the MFP 102 performs NFC communication with a mobile terminal 103, an ID card, or the like, which is put close to the mark 102.

Figure 2:
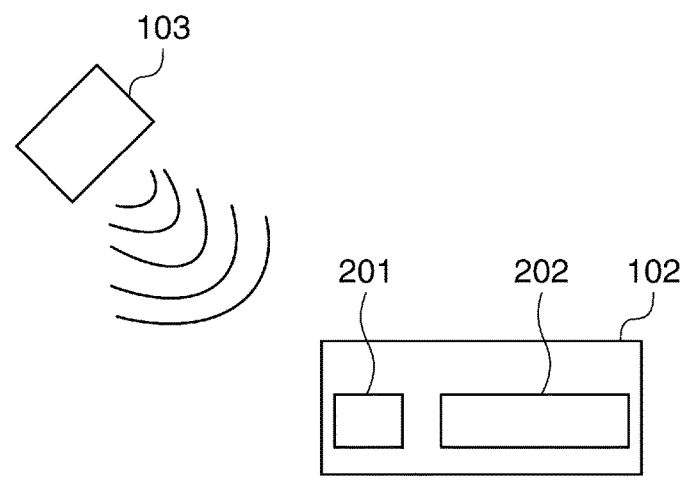
FIG. 2 is a view explaining an arrangement of a mark and its vicinity shown in FIG. 1.

For example, when the mobile terminal 103 is put close to the mark 102, the MFP 101 sends communication setting data, which is for performing wireless LAN communication with the MFP 101, to the mobile terminal 103 via NFC communication. When an IC card (not shown) such as an employee identification card is put close to the mark 102, the MFP 101 obtains user information, which is for log-in to the MFP 101, from the IC card via NFC communication. As shown in FIG. 2, the MFP 101 has an NFC tag 201 (first near-field wireless communication device) and an NFC R/W unit 202 (second near-field wireless communication device) which are capable of performing NFC communication with the mobile terminal 103 or the like, which is put close to the mark 102, and the NFC tag 201 and the NFC R/W unit 202 are arranged close to each other. This prevents a situation in which, when the user gives instructions on processes to be performed by using NFC to the MFP 101, places over which the user holds a device vary with the processes, and therefore improves the ease of use for the user.

The NFC tag 201 is comprised of an IC for RFID (radio-frequency identification) and stores NFC tag data. The NFC tag data includes communication setting data such as an SSID, a passkey, and an IP address, of the MFP 101. The NFC tag 201 sends the communication setting data to the mobile terminal 103 which is put close to the mark 102, via NFC communication. An arrangement of the NFC tag 201 will be described later. The NFC R/W unit 202 has a reader-writer mode and an NFC tag mode. One of the reader-writer mode and the NFC tag mode is enabled, and the other one is disabled. The reader-writer mode and the NFC tag mode are switched in a time-shared manner at intervals determined in advance. Namely, in the present embodiment, the MFP 101 cannot forcefully disable the NFC tag mode of the NFC R/W unit 202.

In the reader-writer mode, when the ID card is put close to the mark 102, the NFC R/W unit 202 obtains user information, which is for log-in to the MFP 101, from the ID card via NFC communication. In the NFC tag mode, the NFC R/W unit 202 stores other setting data different from the communication setting data, which is stored in the NFC tag 201, as NFC tag data, and sends the other setting data via NFC communication. An arrangement of the NFC R/W unit 202 will be described later.

Figure 3:
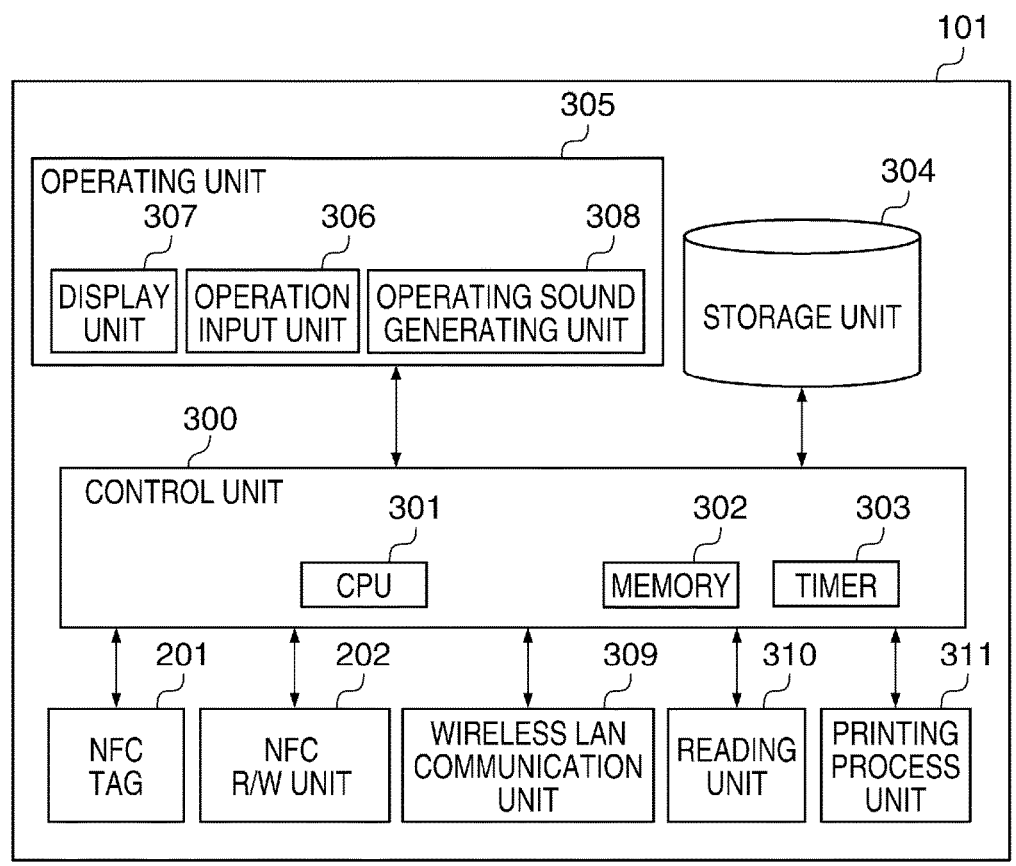
FIG. 3 is a block diagram schematically showing an arrangement of the MFP shown in FIG. 1.

FIG. 3 is a block diagram schematically showing an arrangement of the MFP 101 shown in FIG. 1.

Referring to FIG. 3, the MFP 101 has a control unit 300, a storage unit 304, an operating unit 305, a wireless LAN communication unit 309, a reading unit 310, and a printing process unit 311 as well as the NFC tag 201 and the NFC R/W unit 202. The control unit 300 is connected to each of the NFC tag 201, the NFC R/W unit 202, the storage unit 304, the operating unit 305, the wireless LAN communication unit 309, the reading unit 310, and the printing process unit 311. The control unit 300 has a CPU 301, a memory 302, and a timer 303. The operating unit 305 has an operation input unit 306, a display unit 307, and an operating sound generating unit 308.

The control unit 300 integratedly controls the entire MFP 101. The CPU 301 executes programs, which are stored in the storage unit 304, to control the each component element connected to the control unit 300. The memory 302 is used as a work area for the CPU 301 and also used as a temporary storage area for each data. The timer 303 measures time for each process performed by the control unit 303. The storage unit 304 stores a variety of setting information on the MFP 101, programs which are executed by the CPU 301, and the like.

For example, the storage unit 304 stores the SSID, the passkey, and the IP address of the MFP 101, which are written as the NFC tag data into the NFC tag 201. The operating unit 305 is a user interface of the MFP 101 and receives input information that is input by the user operating the operation input unit 306. The operating unit 305 displays a variety of information on the MFP 101, on the display unit 307 comprised of a liquid crystal panel or the like. The operating unit 305 also outputs operating sounds according to operations by means of the operating sound generating unit 308.

The wireless LAN communication unit 309 is capable of acting as an access point used when the wireless LAN communication unit 309 itself performs wireless LAN communication. In this case, the wireless LAN communication unit 309 performs wireless LAN communication directly with the mobile terminal 103 or the like, without via other access points. The reading unit 310 reads an original placed on an original platen glass (not shown) to generate image data. The printing process unit 311 performs printing based on image data generated by the reading unit 310 or the like.

Figure 4A:
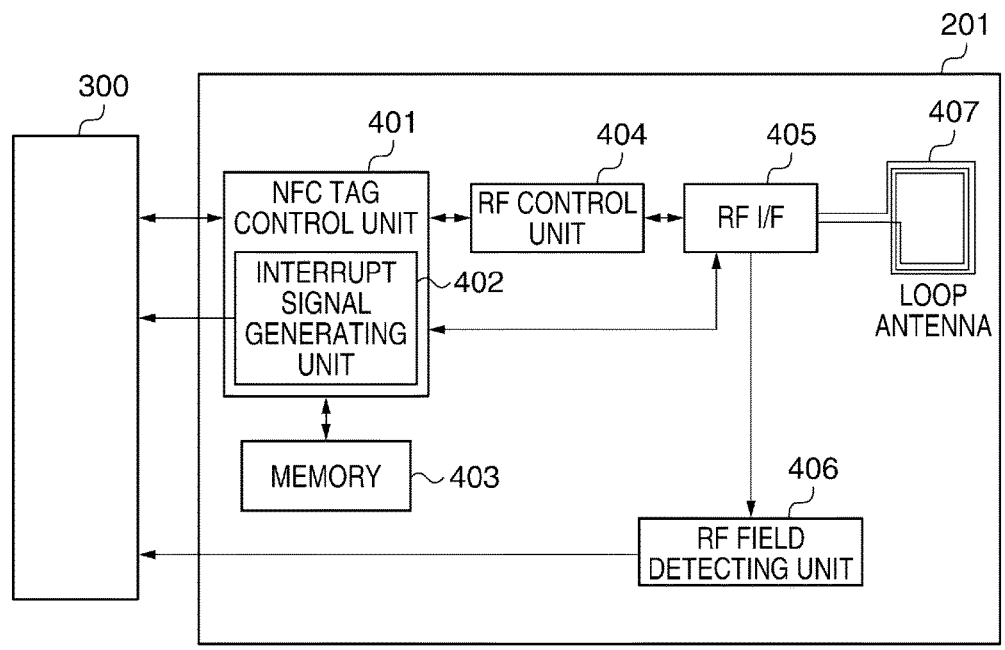
FIGS. 4A and 4B are block diagrams schematically showing an arrangement of an NFC tag and an NFC R/W unit shown in FIG. 2.
Figure 4B:
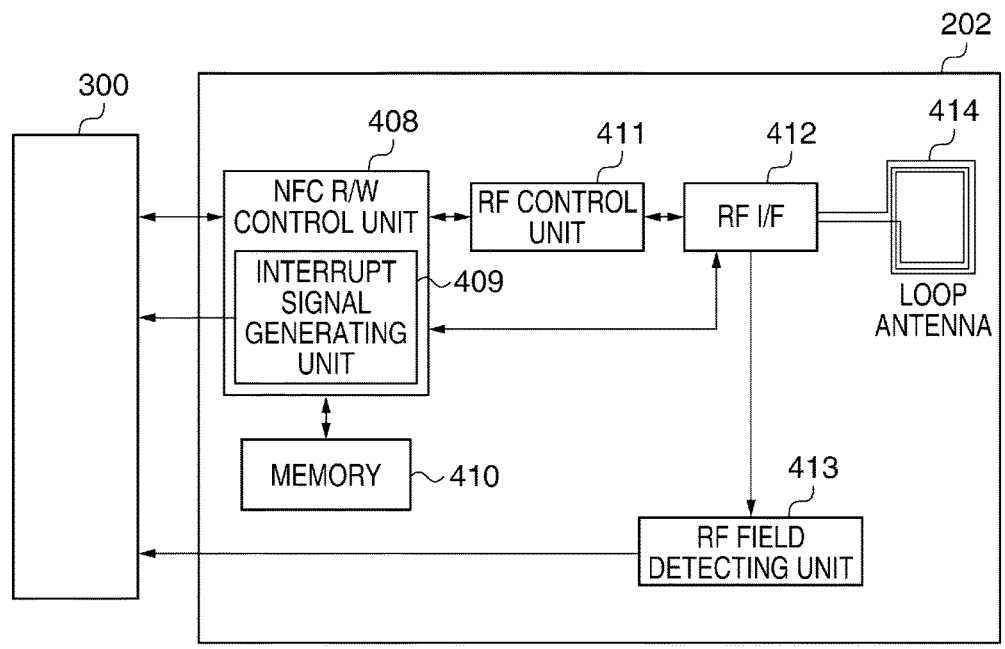

FIGS. 4A and 4B are block diagrams schematically showing arrangements of the NFC tag 201 and the NFC R/W unit 202 shown in FIG. 2. FIG. 4A shows the arrangement of the NFC tag 201, and FIG. 4B shows the arrangement of the NFC R/W unit 202.

Referring to FIG. 4A, the NFC tag 201 has an NFC tag control unit 401, a memory 403, an RF (radio frequency) control unit 404, an RF I/F 405, an RF field detecting unit 406, and a loop antenna 407. The NFC tag control unit 401 has an interrupt signal generating unit 402. The NFC tag control unit 401 is connected to each of the memory 403, the RF control unit 404, and the RF I/F 405. The RF control unit 404 is further connected to the RF I/F 405, and the RF I/F 405 is further connected to the RF field detecting unit 406 and the loop antenna 407.

Upon receiving an electromagnetic wave from the mobile terminal 103 put close to the NFC tag 201, the NFC tag 201 is electromagnetically coupled with the mobile terminal 103 and works using an electromotive force, which is generated by the electromagnetic coupling, as a power source. The NFC tag control unit 401 performs data communications with the control unit 300 and controls the entire NFC tag 201. When the communication setting data stored in the memory 403 is transmitted to the mobile terminal 103, the interrupt signal generating unit 402 outputs a transmission completion interrupt signal (completion notification), which indicates that the transmission of the communication setting data has been completed, to the control unit 300.

The memory 403 is a nonvolatile memory, which stores communication setting data which is NFC tag data. The RF control unit 404 demodulates an electromagnetic wave, which is received from the mobile terminal 103 or the like, into an electric signal, analyzes the electric signal to modulate another electric signal which is to be a response to a command indicated by the electric signal. The RF I/F 405 controls radiation and reception of electromagnetic waves in NFC communications. The RF field detecting unit 406 detects an RF field, which is an electromagnetic field generated by an electromagnetic wave radiated from the mobile terminal 103 or the like put close to the NFC tag 201, and outputs the detection result to the control unit 300. The loop antenna 407 is a loop coil-shaped antenna, which performs NFC communication with the mobile terminal 103 or the like, which is put close to the NFC tag 201.

Referring to FIG. 4B, the NFC R/W unit 202 has an NFC R/W control unit 408, a memory 410, an RF control unit 411, an RF I/F 412, an RF field detecting unit 413, and a loop antenna 414. The NFC R/W control unit 408 has an interrupt signal generating unit 409. The NFC R/W control unit 408 is connected to each of the memory 410, the RF control unit 411, and the RF I/F 412. The RF control unit 411 is further connected to the RF I/F 412, and the RF I/F 412 is further connected to the RF field detecting unit 413 and the loop antenna 414.

The control unit 300 controls supply and shutoff of power to the NFC R/W unit 202, and the NFC R/W unit 202 works using supplied power as a power source. The NFC R/W control unit 408 performs data communications with the control unit 300 and controls the entire NFC R/W unit 202. The NFC R/W control unit 408 also performs a mode switching control to switch the NFC R/W unit 202 between the reader-writer mode and the NFC tag mode. When the NFC R/W unit 202 obtains user information from the ID card put close to the NFC R/W unit 202, the interrupt signal generating unit 409 outputs an obtainment interrupt signal, which indicates that the user information has been obtained, to the control unit 300.

The memory 410 is a nonvolatile memory, which stores other setting data different from the communication setting data stored in the memory 403 of the NFC tag 201. The RF control unit 411 performs demodulation and modulation on electromagnetic waves for performing NFC communication. The RF I/F 412 controls radiation and reception of electromagnetic waves in NFC communications. The RF field detecting unit 413 detects an RF field, which is an electromagnetic field generated by an electromagnetic wave radiated from a device put close to the NFC R/W unit 202. The loop antenna 414 is a loop coil-shaped antenna, which performs NFC communication with a device, which is put close to the NFC R/W unit 202.

Next, a description will be given of a flow of NFC communication performed between the MFP 101 and the mobile terminal 103. For example, it is assumed that the mobile terminal 103 obtains communication setting data from the MFP 101 via NFC communication.

Figure 5A:
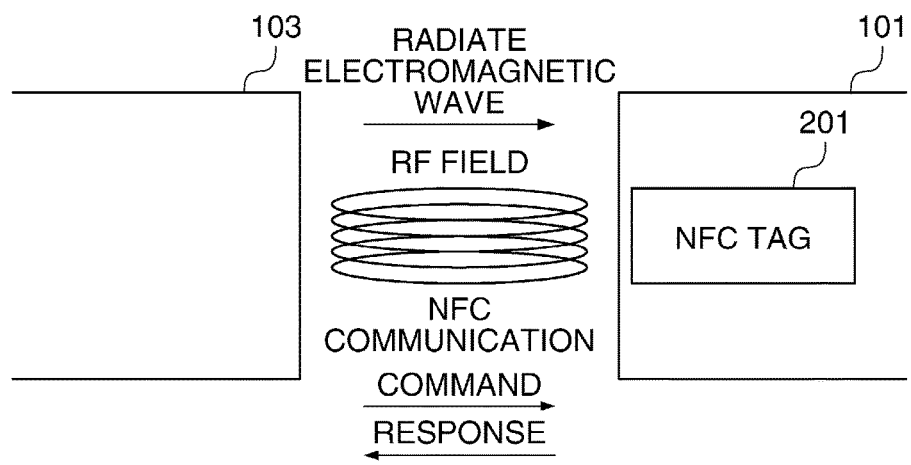
FIGS. 5A and 5B are views explaining a flow of NFC communication performed between the MFP and a mobile terminal shown in FIG. 1.

When the user inputs an instruction to perform NFC communication to the mobile terminal 103, the mobile terminal 103 modulates a command, which requests transmission of communication setting data, into an electromagnetic wave, and radiates the electromagnetic wave (see, for example, FIG. 5A). The electromagnetic wave is radiated at predetermined intervals determined in advance. After that, the user puts the mobile terminal 103 close to the mark 102, and when a distance between the mobile terminal 103 and the mark 102 reaches a predetermined distance at which NFC communication is possible, more specifically, about 20 cm to 30 cm, the loop antenna 407 of the NFC tag 201 receives the electromagnetic wave from the mobile terminal 103.

In the MFP 101, in response to the reception of the electromagnetic wave by the loop antenna 407, the NFC tag 201 is electromagnetically coupled with the mobile terminal 103. After that, upon detecting an electromotive force generated as a result of the electromagnetic coupling, the RF field detecting unit 406 determines that an RF field has been generated, and outputs a detection result signal 500 shown in FIG. 5B, which indicates a generation status of the RF field, to the control unit 300.

Figure 5B:
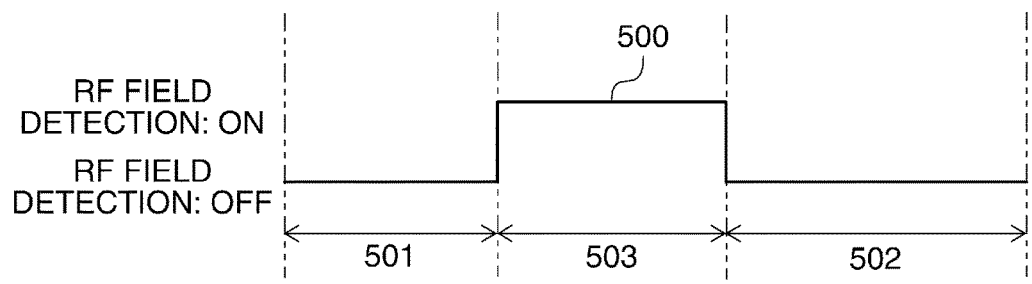

Here, when the RF field detecting unit 406 detects no electromotive force generated as a result of the electromagnetic coupling, the RF field detecting unit 406 outputs the low-level detection result signal 500, which indicates that generation of an RF field has not been detected, to the control unit 300 (for example, periods 501 and 502 shown in FIG. 5B). When the RF field detecting unit 406 detects an electromotive force generated as a result of the electromagnetic coupling, the RF field detecting unit 406 outputs the high-level detection result signal 500, which indicates that generation of an RF field has been detected, to the control unit 300 (for example, a period 503 shown in FIG. 5B). When the control unit 300 detects a transition of the detection result signal 500 from the low level to the high level, the control unit 300 determines that a device capable of NFC communication, for example, the mobile terminal 103 has come close to the mark 102.

Then, in the MFP 101, the RF control unit 404 demodulates the received electromagnetic wave to analyze a command, modulates the communication setting data into an electromagnetic wave in accordance with the analysis result, and radiates the electromagnetic wave to the mobile terminal 103 as a response to the analyzed command. When the electromagnetic wave is radiated to the mobile terminal 103, the interrupt signal generating unit 402 sends the transmission completion interrupt signal to the control unit 300.

Upon receiving the electromagnetic wave from the MFP 101, the mobile terminal 103 demodulates the electromagnetic wave to obtain the communication setting data and configures setting based on the communication setting data. This enables the mobile terminal 103 to perform wireless LAN communication with the MFP 101.

Here, in a case where the NFC R/W unit 202 is arranged close to the NFC tag 201, the MFP 101 may not send desired communication setting data, depending on specifications of the NFC R/W unit 202. For example, in a case where the NFC R/W unit 202 is configured to be subjected to mode switching in a time-shared manner, the NFC tag mode of the NFC R/W unit 202 cannot be forcefully disabled. In this case, the MFP 101 may send other setting data different from desired communication setting data. Thus, the mobile terminal 103 cannot obtain desired communication setting data from the MFP 101, and as a result, the mobile terminal 103 cannot configure communication settings for wireless LAN communication with the MFP 101.

To address this problem, in the present embodiment, in a case where the NFC R/W unit 202 has the NFC tag mode and the mobile terminal 103 is put close to the mark 102, use of functions in the NFC tag mode of the NFC R/W unit 202 is prohibited.

Figure 6:
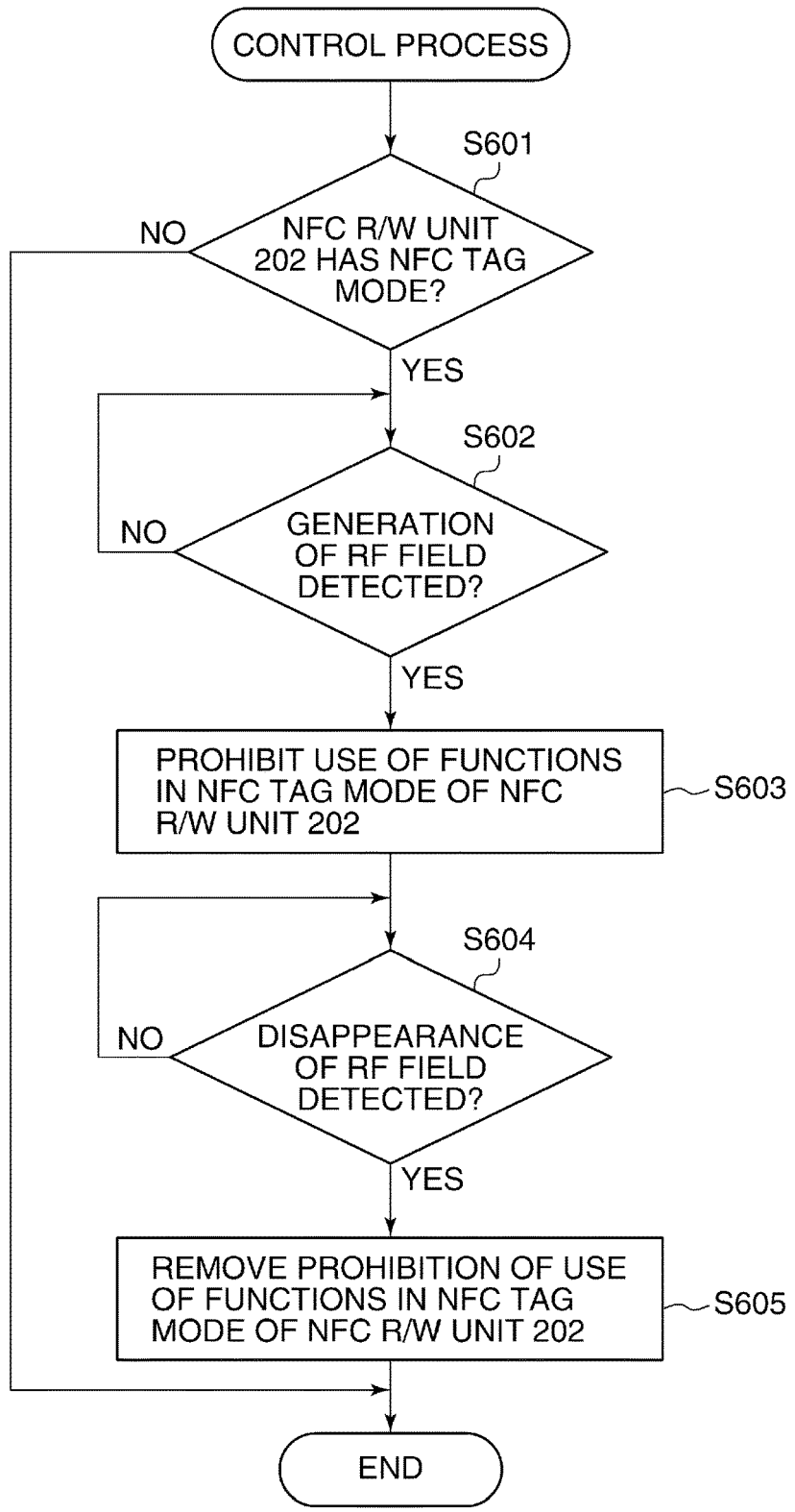
FIG. 6 is a flowchart showing the procedure of a control process which is performed by the MFP shown in FIG. 1.

FIG. 6 is a flowchart showing the procedure of a control process which is performed by the MFP 101 shown in FIG. 1.

The process described in FIG. 6 is performed by the CPU 301 executing programs stored in the storage unit 304 or the like, and it is assumed that power has been supplied to the NFC R/W unit 202 beforehand.

Referring to FIG. 6, first, the CPU 301 obtains model information on the NFC R/W unit 202 from the NFC R/W unit 202, and based on the obtained model information, determines whether or not the NFC R/W unit 202 has the NFC tag mode (step S601) (transmitting function determination unit).

As a result of the determination in the step S601, in a case where the NFC R/W unit 202 has the NFC tag mode (YES in the step S601), the CPU 301 stands by until the CPU 301 detects generation of an RF field in the NFC tag 201. Upon detecting generation of an RF field in the NFC tag 201 based on the detection result signal 500 (YES in step S602) (close state determination unit), the CPU 301 prohibits use of the functions in the NFC tag mode of the NFC R/W unit 202 (step S603). Specifically, the CPU 301 stops supplying power to the NFC R/W unit 202.

After that, the CPU 301 stands by until the RF field in the NFC tag 201 disappears. Upon detecting disappearance of the RF field in the NFC tag 201 based on the detection result signal 500 transiting from the high level to the low level (YES in step S604), the CPU 301 removes the prohibition of use of the functions in the NFC tag mode of the NFC R/W unit 202 (step S605). Specifically, the CPU 301 resumes supplying power to the NFC R/W unit 202. After that, the CPU 301 ends the present process.

As a result of the determination in the step S601, in a case where the NFC R/W unit 202 does not have the NFC tag mode, the CPU 301 ends the present process.

According to the process in FIG. 6 described above, in a case where the NFC R/W unit 202 arranged close to the NFC tag 201 has the NFC tag mode and the mobile terminal 103 is put close to the mark 102, use of the functions in the NFC tag mode of the NFC R/W unit 202 is prohibited. Namely, when the mobile terminal 103 is put close to the mark 102, other setting data different from desired communication setting data is never sent from the NFC R/W unit 202. As a result, even in a case where the NFC R/W unit 202 is located close to the NFC tag 201, the MFP 101 is able to reliably send desired communication setting data irrespective of specifications of the NFC R/W unit 202.

Moreover, according to the process in FIG. 6 described above, the NFC tag mode of the NFC R/W unit 202 is enabled at intervals determined in advance. Namely, the NFC tag mode of the NFC R/W unit 202 cannot be forcefully disabled. Thus, even in a case where the NFC R/W unit 202 arranged close to the NFC tag 201 is configured such that its NFC tag mode cannot be forcefully disabled, the process described in FIG. 6 described above the MFP 101 enables the MFP 101 to send desired communication setting data to the mobile terminal 103 put close to the mark 102.

Furthermore, according to the process in FIG. 6 described above, in a case where the NFC R/W unit 202 has the NFC tag mode and the mobile terminal 103 is put close to the mark 102, supply of power to the NFC R/W unit 202 is prohibited. This reliably prevents the NFC R/W unit 202 from sending other setting data different from desired communication setting data.

In the process in FIG. 6 described above, it is determined whether or not the mobile terminal 103 is put close to the mark 102, based on the detection result signal 500 sent from the NFC tag 201. As a result, it is easily determined whether or not the mobile terminal 103 is put close to the mark 102.

Although the present invention has been described by way of the embodiment, the present invention should not be limited to the embodiment described above.

Figure 7:
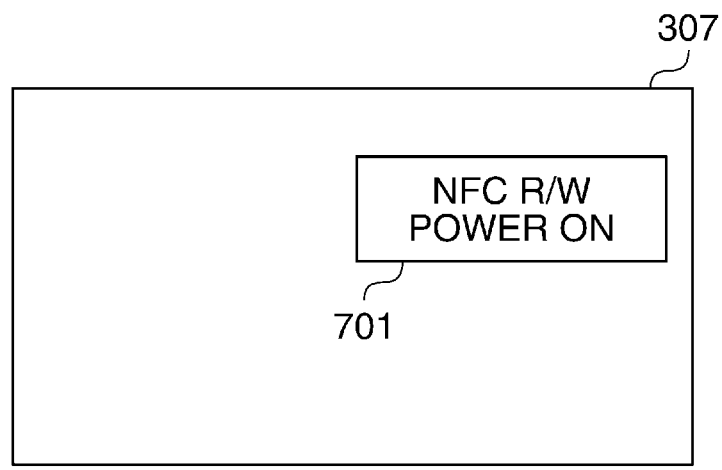
FIG. 7 is a view showing an example of an operating button which is displayed on a display unit shown in FIG. 3.

For example, when supply of power to the NFC R/W unit 202 is stopped in the step S603, an operating button 701 shown in FIG. 7 for instructing to resume supply of power to the NFC R/W unit 202 may be displayed on the display unit 307.

Moreover, although in the present embodiment, supply of power to the NFC R/W unit 202 is stopped as a means to prohibit use of the functions in the NFC tag mode of the NFC R/W unit 202, the means to prohibit use of the functions in the NFC tag mode of the NFC R/W unit 202 should not be limited to this means. For example, in a case where the control unit 300 is able to control the mode switching of the NFC R/W unit 202, the control unit 300 may control to disable the NFC tag mode of the NFC R/W unit 202. This would reliably prevent the NFC R/W unit 202 from sending other setting data different from desired communication setting data while the NFC R/W unit 202 is running.

Furthermore, in the present embodiment, the supply of power to the NFC R/W unit 202 may be resumed when the transmission of the communication setting data by the NFC tag 201 is completed.

Figure 8:
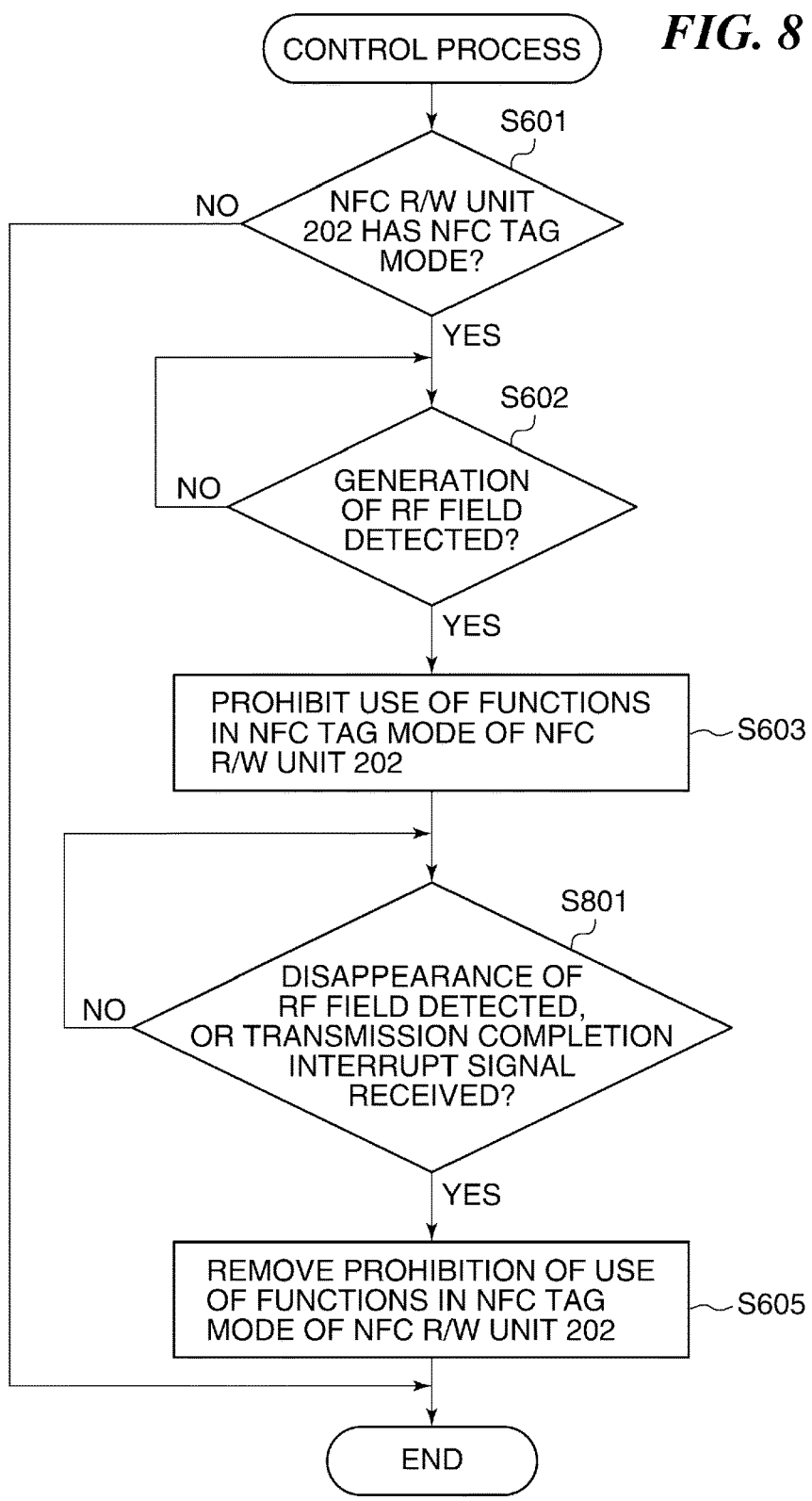
FIG. 8 is s a flowchart showing the procedure of a variation of the control process shown in FIG. 6.

FIG. 8 is a flowchart showing the procedure of a variation of the control process shown in FIG. 6.

The process described in FIG. 8 is performed by the CPU 301 executing programs stored in the storage unit 304 or the like, and it is assumed that power has been supplied to the NFC R/W unit 202 beforehand.

Referring to FIG. 8, first, the CPU 301 performs the processes in the steps S601 to S603. Next, upon detecting disappearance of the RF field in the NFC tag 201 based on the detection result signal 500 or receiving the transmission completion interrupt signal (completion notification) from the NFC tag 201 (YES in step S801), the CPU 301 performs the processes in the step S605 and the subsequent steps.

In the process described in FIG. 8 described above, when disappearance of the RF field in the NFC tag 201 is detected or the transmission completion interrupt signal is received after the supply of power to the NFC R/W unit 202 is stopped, the supply of power to the NFC R/W unit 202 is resumed. This minimizes the time during which the NFC R/W unit 202 is stopped, and therefore prevents use of the NFC R/W unit 202 from being excessively limited.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-253180, filed Dec. 27, 2016, which is hereby incorporated by reference herein in its entirety.

What is claimed is:

1. An information processing apparatus configured to communicate with an external device, the information processing apparatus comprising:
   a first near-field wireless communication device configured to start a communication with the external device in accordance with a reception of a wireless signal transmitted from the external device near the first near-field wireless communication device;
   a second near-field wireless communication device configured to start a communication with the external device in accordance with a reception of a wireless signal transmitted from the external device near the second near-field wireless communication device; and
   at least one processor configured to execute a program to function as:
      a control unit configured to, in a case where both the first near-field wireless communication device and the second near-field wireless communication device receive the wireless signal transmitted from the external device at a same time, control the second near-field wireless communication device to communicate with the external device in accordance with the reception of the wireless signal transmitted from the external device near the second near-field wireless communication device by the second near-field wireless communication device, and control the first near-field wireless communication device not to communicate with the external device even though the first near-field wireless communication devices also receives the wireless signal transmitted from the external device near the first near-field wireless communication device.

2. The information processing apparatus according to claim 1, wherein the second near-field wireless communication device includes a signal line configured to notify the control unit that the wireless signal is received.

3. The information processing apparatus according to claim 1, wherein the control unit is configured to stop supply of power to the first near-field wireless communication device in accordance with the reception of the wireless signal transmitted from the external device near the second near-field wireless communication device by the second near-field wireless communication device.

4. The information processing apparatus according to claim 1, wherein the first near-field wireless communication device includes a Near Field communication Read/Write (NFC R/W) unit.

5. The information processing apparatus according to claim 1, wherein the second near-field wireless communication device includes a Near Field communication (NFC) tag.

6. The information processing apparatus according to claim 1,
   wherein the external device transmits a plurality of wireless signals, and
   wherein the received wireless signal includes a wireless signal satisfying a predetermined condition, from among the plurality of wireless signals transmitted from the external device.

7. The information processing apparatus according to claim 6, wherein the predetermined condition includes an intensity of the received wireless signal being greater than or equal to a predetermined value.

8. The information processing apparatus according to claim 1, wherein the first near-field wireless communication device includes a first mode that starts a communication with the external device in accordance with the wireless signal transmitted from the external device near the second near-field wireless communication device and a second mode that transmits a wireless signal.

9. A control method of controlling an information processing apparatus configured to communicate with an external device, the information processing apparatus including a first near-field wireless communication device and a second near-field wireless communication device, the control method comprising:
   in a case where both the first near-field wireless communication device and the second near-field wireless communication device receive a wireless signal transmitted from the external device at a same time, controlling the second near-field wireless communication device to communicate with the external device in accordance with the reception of the wireless signal transmitted from the external device near the second near-field wireless communication device by the second near-field wireless communication device, and controlling the first near-field wireless communication device not to communicate with the external device even though the first near-field wireless communication devices also receives the wireless signal transmitted from the external device-near the first near-field wireless communication device.

10. A non-transitory computer-readable storage medium storing a program for causing a computer to execute a control method of controlling an information processing apparatus configured to communicate with an external device, the information processing apparatus including a first near-field wireless communication device and a second near-field wireless communication device, the control method comprising:
   in a case where both the first near-field wireless communication device and the second near-field wireless communication device receive a wireless signal transmitted from the external device at a same time, controlling the second near-field wireless communication device to communicate with the external device in accordance with the reception of the wireless signal transmitted from the external device near the second near-field wireless communication device by the second near-field wireless communication device, and controlling the first near-field wireless communication device not to communicate with the external device even though the first near-field wireless communication devices also receives the wireless signal transmitted from the external device-near the first near-field wireless communication device.

11. An information processing apparatus configured to communicate with an external device, the information processing apparatus comprising:
- a first near-field wireless communication device configured to start a communication with the external device in accordance with a wireless signal, of which an intensity is stronger than a predetermined radio wave intensity, transmitted from the external device;
- a second near-field wireless communication device configured to start a communication with the external device in accordance with a wireless signal, of which an intensity is stronger than the predetermined radio wave intensity, transmitted from the external device; and
- at least one processor configured to execute a program to function as:
  - a control unit configured to control, in a case where both the first near-field wireless communication device and the second near-field wireless communication device receive the wireless signal transmitted from the external device at a same time, control the second near-field wireless communication device to communicate with the external device in accordance with the reception of the wireless signal of which the intensity is stronger than the predetermined radio wave intensity, and control the first near-field wireless communication device not to communicate with the external device even in a case where a though the first near-field wireless communication devices also receives the wireless signal, which has an intensity stronger than the predetermined radio wave intensity, transmitted from the external device.

12. The information processing apparatus according to claim 11, wherein the second near-field wireless communication device includes a signal line configured to notify the control unit that the wireless signal is received.

13. The information processing apparatus according to claim 11, wherein the control unit is configured to stop supply of power to the first near-field wireless communication device in accordance with the reception of the wireless signal, which has an intensity stronger than the predetermined radio wave intensity, transmitted from the external device by the second near-field wireless communication device.

14. The information processing apparatus according to claim 11,
- wherein the first near-field wireless communication device includes a Near Field communication Read/Write (NFC R/W) unit, and
- wherein the second near-field wireless communication device includes a Near Field communication (NFC) tag.

15. The information processing apparatus according to claim 11,
- wherein the external device transmits a plurality of wireless signals, and
- wherein the received wireless signal includes a wireless signal satisfying a predetermined condition, from among the plurality of wireless signals transmitted from the external device.

16. The information processing apparatus according to claim 15, wherein the predetermined condition includes an intensity of the received wireless signal being greater than or equal to a predetermined value.

17. The information processing apparatus according to claim 11, wherein the first near-field wireless communication device includes a first mode that starts a communication with the external device in accordance with the wireless signal, of which the intensity is stronger than the predetermined radio wave intensity, transmitted from the external device and a second mode that transmits a wireless signal.

* * * * *